United States Patent [19]

Matsui et al.

[11] Patent Number: 4,873,073

[45] Date of Patent: Oct. 10, 1989

[54] METHOD FOR PRODUCTION OF BISMUTH (III) OXIDE

[75] Inventors: Haruo Matsui, Nagoya; Ippei Nakagawa, Aichi; Kiyotaka Kato, Seto, all of Japan

[73] Assignees: Agency of Industrial Science and Technology; Ministry of International Trade and Industry, both of Tokyo, Japan

[21] Appl. No.: 319,756

[22] Filed: Mar. 7, 1989

[30] Foreign Application Priority Data

Mar. 25, 1988 [JP] Japan .................................. 63-72708

[51] Int. Cl.[4] ............................................. C01B 27/00
[52] U.S. Cl. ..................................................... 423/617
[58] Field of Search ......................................... 423/617

[56] References Cited

U.S. PATENT DOCUMENTS 1,318,336 10/1919 Ellis ...................................... 423/617
1,354,806 10/1920 Darling ................................. 423/617
4,675,171 6/1987 Kubo et al. ........................... 423/617

FOREIGN PATENT DOCUMENTS 11335 4/1972 Japan .................................. 423/617
136922 6/1986 Japan .................................. 423/617
666134 6/1979 U.S.S.R. .............................. 423/617
1122728 11/1984 U.S.S.R. .............................. 423/617

OTHER PUBLICATIONS

Rikagaku Jiten (Physiochemical Dictionary), Japan, 1958, p. 533.
Chemical Abstracts, vol. 106, 1987, pp. 1650CS and 152.

Primary Examiner—John Doll
Assistant Examiner—Wayne A. Langel
Attorney, Agent, or Firm—Oblon, Spivak, McClelland, Maier & Neustadt

[57] ABSTRACT

Minute spherical bismuth (III) oxide particles are produced by adding a monocarboxylic acid to an aqueous solution containing trivalent bismuth ions thereby inducing formation of a bismuth-monocarboxylic acid complex in the aqueous solution, further adding an alkali to the aqueous solution thereby inducing precipitation of the complex, separating the precipitated complex from the solution, and firing the separated complex.

6 Claims, 2 Drawing Sheets

METHOD FOR PRODUCTION OF BISMUTH (III) OXIDE

BACKGROUND OF THE INVENTION

1. Field of the Invention

This invention relates to a novel method for the production of bismuth (III) oxide. More particularly, this invention relates to a method for enabling minute substantially spherical bismuth (III) oxide particles of a substantially uniform diameter useful as a raw material for optical materials, electronic materials, and superconducting substances to be efficiently and economically produced with a firing temperature about 200° C. lower than generally employed by the conventional method.

2. Prior Art Statement

In recent years, the demand for bismuth (III) oxide as a raw material for optical materials, electronic materials, and superconducting substances has been growing rapidly. As means of producing the bismuth (III) oxide, a method which comprises adding an alkali such as sodium hydroxide to an aqueous solution containing a bismuth salt thereby inducing precipitation of bismuth hydroxide or bismuth oxide hydrate in the aqueous solution, collecting the precipitate from the aqueous solution, and firing the recovered precipitate in the air and a method which comprises directly firing bismuth nitrate have been employed heretofore. These are very popular methods as introduced in "Rikagaku Jiten (Physicochemical Dictionary)" published in Japan.

These methods, however, have the following disadvantage. First, they require a high firing temperature of not lower than about 550° C. They generally produce rodlike bismuth (III) oxide particles lacking uniformity in diameter. They are incapable of producing spherical bismuth (III) oxide particles. FIG. 1 graphically shows the results obtained in a comparative experiment to be described later. This graph shows the change of weight (curve 1) observed during the production of bismuth (III) oxide by the firing of bismuth hydroxide in accordance with the conventional method and a typical result (curve 2) of differential thermal analysis. It is noted from the graph that, during the firing, the product of firing lost weight as the temperature increased to the neighborhood of 550° C. and reached a constant weight near 550° C. This fact implies that bismuth (III) oxide is formed in the neighborhood of 550° C. FIG. 3 is a photomicrograph showing (at 5,000 magnifications) a typical particulate structure of bismuth (III) oxide obtained by the firing of bismuth hydroxide mentioned above. This photograph clearly shows that the bismuth (III) oxide so produced was in the form of rodlike and disklike crystals.

In the production of optical materials, various electronic materials, and superconducting substances, the bismuth (III) oxide is used in the form of sintered masses obtained by firing. When the bismuth (III) oxide is in the form of rodlike and disklike particles lacking uniformity in diameter, the sintering thereof proceeds slowly. In this case, it is difficult to obtain sintered masses of substantially compact texture. Moreover, since the sintering requires, for example, such a high firing temperature as more than 550° C., the production of the sintered masses entails a high energy cost.

A method which produces bismuth (III) oxide from bismuth alkoxide as a raw material has been known to the art [Marsh Gary Barton, Fanelli Anthony Joseph, Armor John Nelson, and Zambri Patrick Michael: European Patent Application No. EP 199,930 (Cl B01J2/04), Nov. 05, 1986, U.S. Application Ser. No. 717,931, Mar. 29, 1985]. This method proves to be expensive because the synthesis of the raw material used therefor is complex from the operational point of view.

OBJECT AND SUMMARY OF THE INVENTION

An object of the present invention is to provide a method for enabling minute spherical bismuth (III) oxide particles of substantially uniform diameter to be efficiently and economically produced with a low firing temperature without entailing the drawbacks inherent in the conventional method for the production of bismuth (III) oxide mentioned above.

The inventors have continued a diligent study with a view to attaining the object mentioned above, to find that a precipitated complex obtained by adding a monocarboxylic acid to an aqueous solution containing trivalent bismuth ions thereby inducing formation of a bismuth-monocarboxylic acid complex in the solution, further adding an alkali to the solution thereby inducing precipitation of the complex mentioned above, and removing the precipitated complex from the solution can be effectively fired at a temperature about 200° C. lower than the temperature generally employed by the conventional method and that the bismuth oxide consequently obtained is in the form of substantially spherical particles not more than 1 μm in diameter. The present invention has been completed based on this finding.

To be specific, this invention is directed to a method for the production of bismuth (III) oxide, which method is characterized by adding a monocarboxylic acid to an aqueous solution containing trivalent bismuth ions thereby inducing formation of a bismuth-monocarboxylic acid complex in the solution, then adding an alkali to the solution thereby inducing precipitation of the complex mentioned above in the solution, then removing the precipitated complex from the solution, and firing the recovered precipitated complex.

The above and other objects and features of the invention will become more apparent from the following detailed description with reference to the accompanying drawings.

DETAILED DESCRIPTION OF THE PREFERRED EMBODIMENTS

Figure 1:
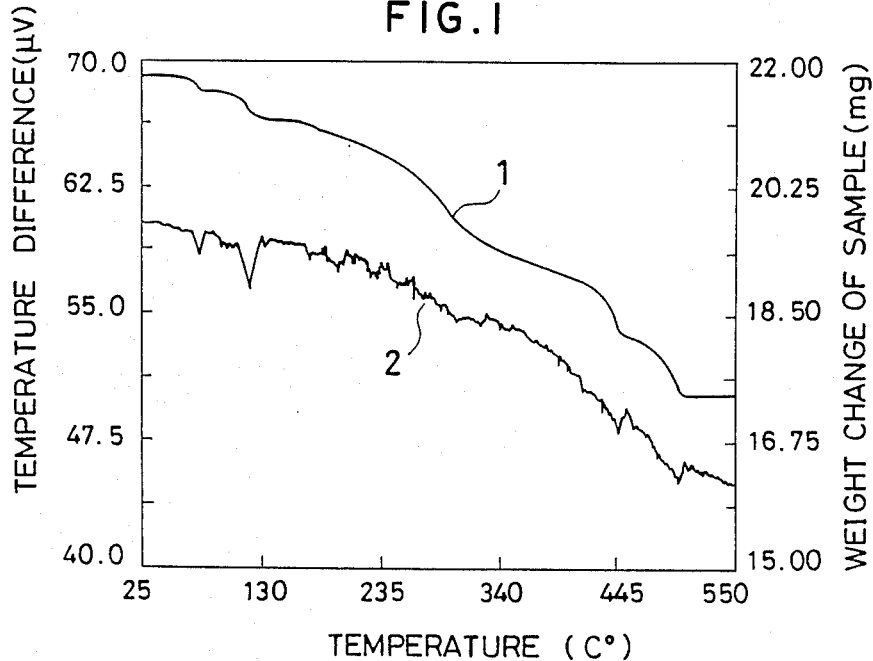
FIG. 1 is a graph showing the change in weight of a sample and the results of differential thermal analysis of the sample during the production of bismuth (III) oxide by the firing of the bismuth hydroxide sample by the method indicated in Comparative Experiment.

Now, the present invention will be described in detail below.

The aqueous solution containing trivalent bismuth ions and used in the method of this invention may be an aqueous solution which is prepared by dissolving a soluble bismuth salt such as, for example, bismuth (III) nitrate, bismuth (III) sulfate, or bismuth chloride (III) in an aqueous medium to a pH value of not more than 1.0 (generally in the range of pH 1.0 to pH 0.6).

In this case, the otherwise possible precipitation of rodlike bismuth hydroxide particles in the solution can be precluded by adjusting the pH of the solution with an acid such as nitric acid, sulfuric acid, hydrochloric acid, or perchloric acid to be added thereto in a ratio in the range of 5 to 10 ml per liter. Among other acids mentioned, perchloric acid proves to be particularly desirable because it possesses an action of effecting the pH adjustment and, at the same time, an action of oxidizing monovalent and divalent bismuth ions contained as impurities in the solution into trivalent bismuth ions. The aqueous media which are useful herein include water and organic solvents compatible with water such as, for example, methanol, ethanol, diethyl ether, and acetone. Though the concentration of trivalent bismuth ions is not specifically restricted, it is generally selected in the range of 0.1 to 1.0 mol/dm$^3$ for the sake of practical use.

In the method of the present invention, so as to cause the aqueous solution prepared as described above to contain trivalent bismuth ions and possess a pH value of not more than 1.0, a monocarboxylic acid is added thereto to induce formation of a bismuth-monocarboxylic acid complex. The monocarboxylic acids which are usable for this addition include formic acid, acetic acid, propionic acid, and butanonic acid, for example. Desirably, this monocarboxylic acid is used in an amount stoichiometrically required for the formation of the complex, in a slightly excess amount, or practically in an amount two to three times the stoichiometric amount.

Now, one desirable manner of the addition of an alkali to the solution formed as a result of the addition of the monocarboxylic acid will be described. The solution already containing the monocarboxylic acid and the alkali added thereto are stirred to induce precipitation of the bismuth-monocarboxylic acid complex mentioned above. If the amount of the alkali to be added is unduly large, there ensues a possibility of precipitation of bismuth hydroxide. Thus, the addition of the alkali in such an unduly large amount must be avoided attentively. A very fine precipitate can be produced in this case, for example, by discontinuing the addition of the alkali at the time that the pH value of the solution reaches a level slightly below the value causing the precipitation of the complex, adding water thereto in an amount substantially equal to that of the solution, and continuing the stirring. The alkali to be added is desired to be an aqueous solution containing the hydroxide of an alkali metal such as, for example, sodium hydroxide or potassium hydroxide. The concentration of the hydroxide of the alkali metal in the aqueous solution is selected in a range in which the change of pH value of the solution resulting from this addition is attained easily, i.e. generally in the range of 0.5 to 2.0 mol/dm$^3$ for the sake of practical use. The pH value at which the precipitation of the complex begins to occur varies with the kind of the monocarboxylic acid. It is about 1.8 in the case of formic acid, about 3.0 in the case of acetic acid, about 4.9 in the case of propionic acid, and about 5.3 in the case of butanonic acid.

The precipitated bismuth-monocarboxylic acid complex produced as described above is taken out of the solution by a well-known means such as filtration centrifugation, then dried, and subsequently fired. The firing temperature is at least 340° C., practically in the range of 340° to 360° C. The firing time is in the range of two to four hours. As the result of this firing, there is produced bismuth (III) oxide.

Figure 2:
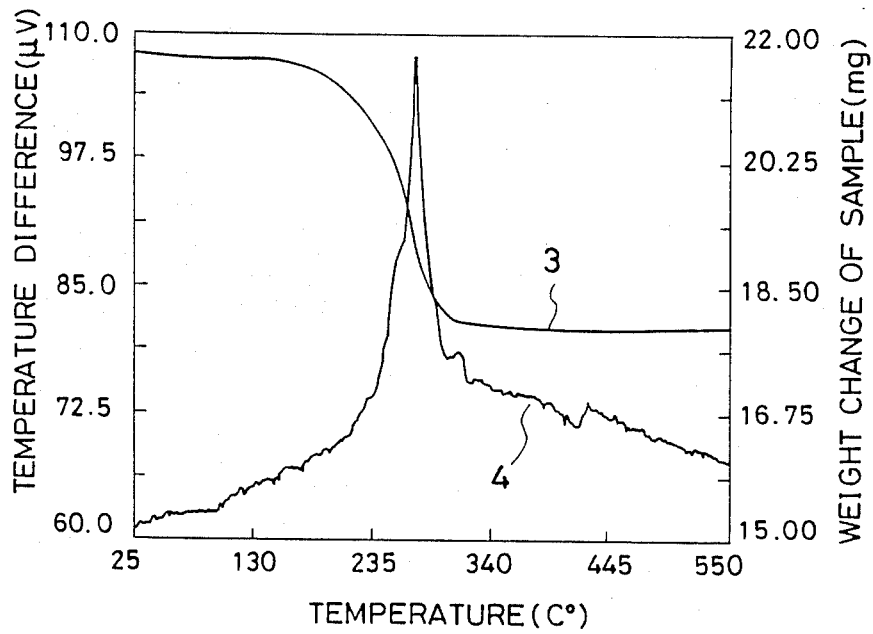
FIG. 2 is a graph showing the change in weight of a sample and the results of differential thermal analysis of the sample during the production of bismuth (III) oxide by the method of this invention indicated in Example 1.
Figure 4:
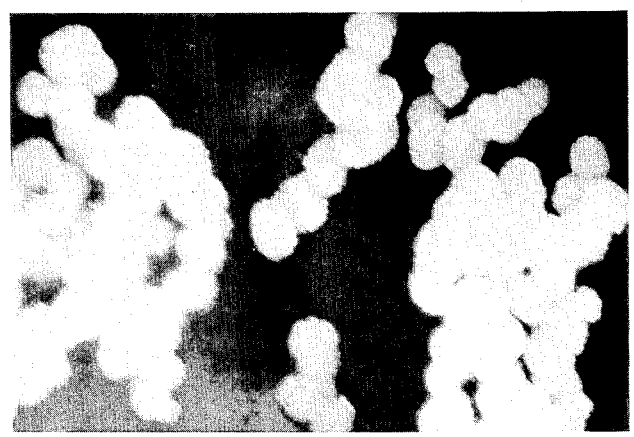
FIG. 4 is a photomicrograph showing at 5,000 magnifications a typical crystalline structure of the bismuth (III) oxide obtained by the method of Example 1.

FIG. 2 shows the change in weight of a sample and the results of differential thermal analysis of the sample during the production of bismuth (III) oxide by firing a bismuth-monocarboxylic acid (propionic acid) sample. It will be noted from this graph that the reaction is exothermic, the weight of the sample reaches a constant value at a temperature above 340° C., and the firing produces bismuth (III) oxide at this temperature. FIG. 4 is a photomicrograph showing at 5,000 magnifications typical bismuth (III) oxide particles formed as a result of firing the bismuth-monocarboxylic acid (propionic acid) complex in Example 1. It is noted from this photograph that the bismuth (III) oxide obtained by the method of this invention is in the form of substantially spherical particles of uniform diameter of not more than 1 μm.

The bismuth (III) oxide particles obtained as described above can be dried by any of the conventional methods such as, for example, vacuum drying, hot air drying, air drying, and freeze drying. The bismuth-monocarboxylic acid complex which is formed during the course of production by the method of this invention possesses a structure represented by the general formula: Bi$_3$R$_3$ (wherein R$_3$ stands for the anion of monocarboxylic acid). Specifically, the bismuth-monocarboxylic acid complex possesses this structural formula:

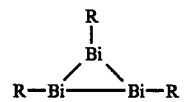

Figure 3:
FIG. 3 is a photomicrograph showing at 5,000 magnifications a typical crystalline structure of the bismuth (III) oxide obtained by the conventional method indicated in Comparative Experiment.

When an alkali is added instead of adding a monocarboxylic acid to the aqueous solution containing trivalent bismuth ions and possessing a pH value of not more than 1.0 as practiced in a typical conventional method, there ensues precipitation of bismuth hydroxide or bismuth oxide hydrate even under a strongly acidic condition evinced by a pH value of not more than 1.0. When this precipitate is dried and then fired, bismuth (III) oxide is formed at a firing temperature of about 550° C. FIG. 1 shows the change in weight (curve 1) of a sample and a typical result of differential thermal analysis of a sample (curve 2) during the production of bismuth (III) oxide by the firing of a bismuth hydroxide sample. It will be noted from this graph that the weight reaches a constant level when the firing temperature reaches about 550° C. and that bismuth (III) oxide is formed at this temperature. FIG. 3 is a photomicrograph showing typical bismuth (III) oxide particles obtained by the firing of the bismuth hydroxide mentioned above. It will be noted from this photograph that the bismuth (III) oxide obtained by the firing of bismuth hydroxide was composed of rodlike and disklike particles lacking uniformity of diameter, unlike the powder obtained by the method of this invention.

In accordance with the method of this invention, substantially spherical bismuth (III) oxide particles of a uniform diameter of not more than 1.0 μm can be efficiently and economically produced with a firing temperature about 200° C. lower than that employed by the conventional method. When this bismuth (III) oxide is fired, it is sintered rapidly to produce sintered masses of compact texture. The sintered masses are advantageously used as a raw material for optical materials, electronic materials, and superconducting substances.

Now, the present invention will be described more specifically below with reference to working examples. It should be noted, however, that the present invention is not restricted in any way by these examples.

EXAMPLE 1

An aqueous solution containing bismuth (III) ions in a concentration of 0.1 mol/dm$^3$ was prepared by dissolving bismuth nitrate in water and adding to the resultant solution about 7 ml of perchloric acid per liter. In a beaker, 100 ml of the aqueous solution was placed and 5 ml of reagent quality propionic acid was added thereto. The resultant solution was found to possess a pH value of 0.73.

Then, the solution was kept stirred and an aqueous solution containing sodium hydroxide in a concentration of 1 mol/dm$^3$ was added thereto at a rate of 0.05 ml/min, with the change in pH value of the solution kept under observation with the aid of a hydrogen ion concentration meter, and the addition of the aqueous sodium hydroxide solution was discontinued when the pH value surpassed 4.80. The resultant solution and water added thereto in an amount substantially equal to the amount of the solution were stirred for one hour. As the result, there occurred a fine precipitate.

Then, the solution containing this precipitate was treated with a centrifugal separator operated at a rate of 4,000 rpm to effect solid-liquid separation. The solid fraction was washed out of the beaker with running water. The separated solid fraction and distilled water added thereto were subjected again to solid-liquid separation by the same method. This procedure of purification was repeated three times. The solid fraction finally obtained was placed in a flask of the shape of an eggplant and subjected to freeze drying.

The white solid powder obtained as a result of the drying was placed in a platinum evaporation dish and fired in an electric oven at 350° C. for three hours, to obtain bismuth (III) oxide. This powder was found to be not less than 99.9% in purity. It was composed of substantially spherical particles having a uniform diameter of not more than 1.0 μm. The particulate structure of this bismuth (III) oxide is shown in the photomicrograph of FIG. 4.

Part of the freeze dried powder was fired to find the change in weight during the course of the firing and was subjected to differential thermal analysis. The results were as shown in FIG. 2 (curve 3 and curve 4 respectively).

EXAMPLE 2

Bismuth (III) oxide was obtained by repeating the procedure of Example 1, except that 5 ml of reagent quality butanonic acid (pH value of solution 0.75) was used in the place of propionic acid and then the same aqueous sodium hydroxide solution as used in Example 1 was added until the pH value of the solution surpassed 5.20. The produced powder was found to be not more than 99.9%. It was composed of minute substantially spherical particles of a uniform diameter of not more than 1.0 μm.

COMPARATIVE EXPERIMENT

An aqueous solution containing bismuth (III) ions in a concentration of 0.1 mol/dm$^3$ was prepared by dissolving bismuth nitrate in water and adding to the resultant solution perchloride acid. In a beaker, 100 ml of this solution was placed and kept stirred and an aqueous solution containing sodium hydroxide in a concentration of 1 mol/dm$^3$ was added at a rate of 0.05 ml/min to raise the pH value to 0.90 and induce precipitation of bismuth hydroxide or bismuth oxide hydrate. Subsequently, the bismuth hydroxide precipitate was treated in the same manner as in Example 1, fired at 550° C. for three hours, to obtain bismuth (III) oxide. This powder was found to be 99.4% in purity. It was composed of rodlike particles lacking uniformity of diameter.

FIG. 3 is a photomicrograph showing the particulate structure of bismuth (III) oxide. Part of the dried bismuth hydroxide powder was fired and subjected to differential thermal analysis. The results were as shown in FIG. 1.

What is claimed is:

1. A method for the production of spherical bismuth (III) oxide particles, which method consists essentially of adding a monocarboxylic acid to an aqueous solution containing trivalent bismuth ions thereby inducing formation of a bismuth-monocarboxylic acid complex in said solution, then adding an alkali to said solution thereby inducing precipitation of said complex therein, subsequently separating said precipitate from said solution, and firing the separated precipitate.

2. A method according to claim 1, wherein said aqueous solution containing trivalent bismuth ions is prepared by dissolving a soluble bismuth salt in at least one member selected from the group consisting of water and organic solvents compatible with water and adjusting the resultant solution to a pH value of not more than 1.0

3. A method according to claim 1, wherein said monocarboxylic acid is at least one member selected from the group consisting of formic acid, acetic acid, propionic acid, and butanonic acid.

4. A method according to claim 1, wherein said alkali for addition is an aqueous solution containing the hydroxide of an alkali metal.

5. A method according to claim 1, wherein said bismuth (III) oxide is in the form of substantially spherical particles not more than 1.0 μm in diameter.

6. A method according to claim 1, which further comprises adding at least one member selected from the group consisting of perchloric acid, nitric acid, sulfuric acid, and hydrochloric acid to said aqueous solution containing trivalent bismuth ions.

* * * * *